United States Patent
Schmieder

(10) Patent No.: US 12,290,877 B2
(45) Date of Patent: May 6, 2025

(54) METHOD FOR PRODUCING A TRACTION BATTERY OF A MOTOR VEHICLE AND CORRESPONDING PRODUCTION DEVICE

(71) Applicant: AUDI AG, Ingolstadt (DE)

(72) Inventor: Walter Schmieder, Hepberg (DE)

(73) Assignee: Audi AG, Ingolstadt (DE)

( * ) Notice: Subject to any disclaimer, the term of this patent is extended or adjusted under 35 U.S.C. 154(b) by 901 days.

(21) Appl. No.: 17/235,063

(22) Filed: Apr. 20, 2021

(65) Prior Publication Data

US 2021/0346986 A1 Nov. 11, 2021

(30) Foreign Application Priority Data

May 7, 2020 (DE) .......................... 102020112441.4

(51) Int. Cl.
| | |
|---|---|
| B23K 26/26 | (2014.01) |
| H01M 10/42 | (2006.01) |
| H01M 10/48 | (2006.01) |
| H01M 50/209 | (2021.01) |
| H01M 50/249 | (2021.01) |
| H01M 50/502 | (2021.01) |
| H01M 50/547 | (2021.01) |
| H01R 43/02 | (2006.01) |

(52) U.S. Cl.
CPC ........... *B23K 26/26* (2013.01); *H01M 10/425* (2013.01); *H01M 10/482* (2013.01); *H01M 10/486* (2013.01); *H01M 50/209* (2021.01); *H01M 50/249* (2021.01); *H01M 50/502* (2021.01); *H01M 50/547* (2021.01); *H01M 2220/20* (2013.01); *H01R 43/0221* (2013.01)

(58) Field of Classification Search
CPC .. H01M 10/486; H01M 10/48; H01M 10/482; H01M 50/528; H01M 6/42; G01K 1/14
USPC ........................................................ 219/121
See application file for complete search history.

(56) References Cited

U.S. PATENT DOCUMENTS

| | | | |
|---|---|---|---|
| 2013/0252049 A1* | 9/2013 | Fleckenstein | ....... H01M 10/482 429/90 |
| 2015/0110155 A1 | 4/2015 | Turgeon et al. | |
| 2022/0238926 A1* | 7/2022 | Shafie | ................. H01M 50/204 |

FOREIGN PATENT DOCUMENTS

| | | |
|---|---|---|
| CN | 102473979 A | 5/2012 |
| CN | 202276164 U | 6/2012 |
| CN | 106321201 A | 1/2017 |
| CN | 206742436 U | 12/2017 |
| CN | 108199101 A | 6/2018 |
| CN | 209071557 U | 7/2019 |
| CN | 209544438 U | 10/2019 |

(Continued)

OTHER PUBLICATIONS

Pantel, WO 2016074843 (Year: 2016).*

(Continued)

*Primary Examiner* — Vy T Nguyen
(74) *Attorney, Agent, or Firm* — Maier & Maier, PLLC

(57) ABSTRACT

A method for producing a traction battery of a motor vehicle. At least one cell module having multiple battery cells is arranged in a receptacle compartment of a battery housing of the traction battery. The battery cells are provided with a separate temperature sensor At least one temperature sensor is arranged on a metal carrier in each case and the metal carrier is welded to a cell housing of the respective battery cell.

8 Claims, 2 Drawing Sheets

(56) References Cited

FOREIGN PATENT DOCUMENTS

| | | |
|---|---|---|
| DE | 102010062207 A1 | 5/2012 |
| DE | 102011004353 A1 | 8/2012 |
| DE | 102014200997 A1 | 7/2015 |
| KR | 20160061638 A | 6/2016 |
| WO | 2016/074843 A1 | 5/2016 |
| WO | 2017/102272 A1 | 6/2017 |

OTHER PUBLICATIONS

Office Action issued on Feb. 2, 2024, in corresponding Chinese Application No. 202110479876.9, 18 pages.
German Examination Report issued on Dec. 21, 2020 in corresponding German Application No. 10 2020 112 441.4; 12 pages; Machine translation attached.

\* cited by examiner

METHOD FOR PRODUCING A TRACTION BATTERY OF A MOTOR VEHICLE AND CORRESPONDING PRODUCTION DEVICE

FIELD

The invention relates to a method for producing a traction battery of a motor vehicle, wherein at least one cell module having multiple battery cells is arranged in a receptacle compartment of a battery housing of the traction battery. The invention further relates to a production device for producing a traction battery.

BACKGROUND

For example, document US 2015/0110155 A1 is known from the prior art. This describes a measuring sensor for a motor vehicle battery having a measuring line made of a first material and a component of the motor vehicle battery made of a second material different from the first material.

SUMMARY

The object of the invention is to propose a method for producing a traction battery of a motor vehicle, which has advantages over known methods, in particular enables rapid and inexpensive production of the traction battery, wherein the traction battery is designed in such a way that extremely accurate temperature measurement is possible.

This object is achieved according to the invention by a method for producing a traction battery of a motor vehicle. It is provided that each of the battery cells is provided with a separate temperature sensor, wherein at least one temperature sensor is arranged on a metal carrier in each case and the metal carrier is welded to a cell housing of the respective battery cell.

The method described is used to produce the traction battery, which is preferably installed as a component of the motor vehicle, but can also be present separately from it. The traction battery is used to temporarily store electrical energy, which is used in particular to operate a drive device or a drive unit of the motor vehicle and thus ultimately to drive the motor vehicle. The electrical energy stored in the traction battery is thus used to provide a drive torque intended to drive the motor vehicle by means of the drive device or the drive unit.

The traction battery has the battery housing and the at least one cell module. The cell module is used to temporarily store electrical energy. For this purpose, it has multiple battery cells which are electrically connected to one another. In particular, the cell module has two terminals, which are arranged, for example, on a cell module housing of the cell module. Each of the battery cells of the corresponding cell module is electrically connected to the terminals. In this respect, the terminals serve as common terminals for the multiple battery cells of the cell module.

In the battery housing of the traction battery, the receptacle compartment is formed, which is provided and designed to receive the cell module. During the production of the traction battery, the cell module is inserted into the receptacle compartment. Preferably, not only a single cell module is arranged in the battery housing, but rather multiple cell modules are introduced into the battery housing. In such a configuration, the battery housing has a receptacle compartment which is designed to accommodate multiple cell modules.

During the production of the traction battery, not only is the cell module or the cell modules arranged in the receptacle compartment, but the cell module or the cell modules are also electrically connected. For example, the cell module or each of the cell modules is electrically connected to a control unit of the traction battery. It can also be provided that at least some of the multiple cell modules, in particular all of the cell modules, are electrically connected to one another.

During operation of the traction battery, in particular when charging or discharging the traction battery, heat accumulates at or in the cell module, which results in a change in the temperature of the cell module. For this reason, it makes sense to monitor the temperature of the traction battery and preferably to carry out the operation of the traction battery as a function of the temperature. In order to enable a particularly accurate determination of the temperature, each of the battery cells of the cell module is equipped with a separate temperature sensor. Accordingly, there are as many temperature sensors as there are battery cells for the cell module or each of the cell modules.

In this case, each of the temperature sensors is particularly preferably arranged on precisely one of the battery cells or, conversely, precisely one of the temperature sensors is arranged on each of the battery cells. As a result, the temperature of each of the battery cells within the cell module is known, so that ultimately a temperature distribution in the traction battery can be determined with a high degree of accuracy. Accordingly, the temperature or temperature distribution, on which the operation of the traction battery is based, is known with a high degree of accuracy.

However, on the one hand, it is expensive to provide each of the battery cells with the separate temperature sensor and, on the other hand, with known fastening methods, the heat transfer between the respective battery cell and the temperature sensor can be impaired, in particular with increasing age of the traction battery.

For this reason, it is provided that each of the temperature sensors is arranged on a respective metal carrier and this is then welded to the cell housing of the respective battery cell. There are therefore multiple metal carriers, wherein at least one of the temperature sensors is arranged, in particular fastened, on each of the metal carriers. Each of the multiple metal carriers is now welded to the cell housing of at least one of the battery cells, that is to say connected in a materially bonded manner.

The temperature sensor is arranged or fastened on the metal carrier in such a way that a good heat transfer between them is ensured. With the aid of the temperature sensor, a temperature of the metal carrier can be measured with high degree of accuracy. The metal carrier consists of a material having good thermal conductivity, i.e., a high coefficient of thermal conductivity. This ensures that the heat emitted by the cell housing to the metal carrier is quickly conducted in the direction of the temperature sensor. In addition, by welding the metal carrier to the cell housing, good heat transfer or a high coefficient of heat transfer is implemented between the cell housing and the metal carrier.

The material of the metal carrier contains, for example, aluminum or copper, in particular it primarily consists of one of these materials. This means that, for example, aluminum or copper or an alloy of one of these materials is used as the material. However, it can also be provided that steel is used as the material for the metal carrier. The cell housing particularly preferably also consists of metal, at least in some areas or even completely.

For example, the cell housing has at least one fastening region made of metal, to which the metal carrier is welded during the production of the traction battery. The fastening region preferably adjoins, on its side facing away from the metal carrier, an interior of the respective battery cell which is delimited by the cell housing. This ensures that an accurate measurement of the temperature of the battery cell can be performed via the fastening region.

The direct welding of the metal carrier carrying the temperature sensor to the cell housing of the respective battery cell, carried out in the context of the described method, enables the temperature of the battery cell to be measured quickly and accurately because the temperature is applied to the metal carrier and thus to the temperature sensor in a short time. In addition, the connection between the metal carrier and the cell housing is permanent, so that no impairment of the temperature measurement can occur over the service life of the traction battery. Furthermore, the welding of the metal carrier to the cell housing can be implemented inexpensively.

One refinement of the invention provides that each of the battery cells has at least one terminal for electrical contacting and the terminals of multiple battery cells are electrically connected to one another via a common connector, wherein the connector is welded to the terminals. It has already been pointed out above that the cell module has multiple terminals. It is provided that the at least one terminal of each of the battery cells is electrically connected to one of the terminals or the terminals of the cell module. For this purpose, the connector is provided, via which the terminals of the multiple battery cells are electrically connected to one of the terminals of the cell module.

There are preferably multiple such connectors, wherein each of the connectors is connected to one of the terminals of the cell module. The connector is in the form of a metal rod, in particular a flat rod, for example. The connector is welded to the terminals of the battery cells in order to establish the electrical connection. This enables a particularly rapid and durable electrical connection of the battery cells, in particular to the terminals of the cell module.

One refinement of the invention provides that the connector is welded to the terminals in the same work step as the metal carrier is welded to the cell housing. For example, it is therefore provided that the welding of the connector and the welding of the metal carrier take place in the same processing station, while the battery cells or the cell module are thus arranged in a stationary manner. For example, the battery cells of the cell module are first arranged adjacent to one another and then the connector is brought into contact with the terminals of the battery cells.

The connector is then welded to the terminals. In addition, the metal carrier is welded to the cell housing without the battery cells being displaced. By welding in the same work step, the metal carrier can be attached to the cell housing in a particularly simple and inexpensive manner; in particular, it is advantageously integrated into an already existing production method for the traction battery.

One refinement of the invention provides that the welding is carried out by laser welding. A laser beam is therefore generated for welding, in particular with the aid of a laser head. Using the laser beam, the metal carrier and/or the cell housing are melted locally so that a materially bonded connection is established. The laser welding can be carried out particularly quickly and inexpensively, in particular with minor temperature application to the battery cells at the same time.

One refinement of the invention provides that the connector is welded to the terminals by means of the same laser head or at the same time as the metal carrier is welded to the cell housing. If the connector is welded using the same laser head, the battery cells thus always remain in the same manufacturing station. The laser beam generated with the aid of the laser head is now first used to weld the connector to the terminals. The metal carrier is then welded to the cell housing. Of course, the reverse sequence can also be provided.

Between the welding of the connector to the terminals and the welding of the metal carrier to the cell housing, the cell head is displaced in order to align the laser beam. Alternatively, it can be provided that the welding of the connector and the welding of the metal carrier are carried out at the same time. For example, multiple laser heads are provided for this purpose. The simultaneous welding results in particularly rapid production of the traction battery.

One refinement of the invention provides that the at least one temperature sensor is arranged on a printed circuit board which is connected to the metal carrier. The temperature sensor is electronically connected via the printed circuit board, for example to a control unit, in particular to the control unit of the traction battery. The printed circuit board is connected to the metal carrier or fastened to it. The circuit board is connected to the metal carrier in such a way that the temperature sensor is coupled to the metal carrier in a thermally conductive manner, so that the temperature of the metal carrier is thus measurable with the aid of the temperature sensor.

The printed circuit board is preferably arranged on the metal carrier in such a way that the temperature sensor rests directly on the metal carrier or, alternatively, is thermally connected to the metal carrier via a heat-conducting material. A heat-conducting paste or the like is used as the heat-conducting material, for example. The procedure described enables accurate temperature measurement with, at the same time, reliable electronic contacting of the temperature sensor.

One refinement of the invention provides that a flexible printed circuit board is used as the printed circuit board. The flexible printed circuit board consists, for example, of a film, in particular a polyimide film, having conductor tracks applied thereon. The use of the flexible printed circuit board has the advantage that it only has a low thermal capacity, so that corruption of the temperature measurement by means of the temperature sensor is prevented. In addition, small cell module dimensions may be achieved with the aid of the flexible printed circuit board, because it can be installed in the smallest of spaces. Tolerance compensation is also achieved via the flexible printed circuit board, in particular, it permits a compensation movement due to aging phenomena and/or thermal stresses within the cell module.

One refinement of the invention provides that the metal carrier has a retaining foot which is wider than a connecting region carrying the at least one temperature sensor and is welded to the cell housing of the respective battery cell. The metal carrier thus has the retaining foot and the connecting region. The temperature sensor engages on the connecting region or the temperature sensor is carried by the connecting region. The connecting region is fastened to the cell housing of the respective battery cell via the retaining foot. For this purpose, the retaining foot is welded to the cell housing. The retaining foot has larger dimensions in one direction than the connecting region. This enables reliable welding to the cell housing. The retaining foot can also be referred to as a fastening tab.

One refinement of the invention provides that a prismatic battery cell is used as the battery cell. This means that the cell housing is designed to be rigid in order to at least partially or even completely prevent a volume change of the battery cell. The battery cell enables a particularly high packing density of the battery cells in the cell module.

The invention further relates to a production device for producing a traction battery of a motor vehicle, in particular for carrying out the method according to the statements within the scope of this description, wherein the production device is provided and designed to arrange at least one cell module having multiple battery cells in a receptacle compartment of a battery housing of the traction battery. The production device is furthermore provided and designed to provide each of the battery cells with a separate temperature sensor, wherein at least one temperature sensor is arranged on a metal carrier in each case and the metal carrier is welded to a cell housing of the respective battery cell.

The advantages of such a procedure and of such a design of the production device have already been discussed. Both the production device and also the method for its operation can be refined according to the statements within the scope of this description, to which reference will therefore be made.

BRIEF DESCRIPTION OF THE FIGURES

In the following, the invention will be explained in greater detail with reference to the exemplary embodiments depicted in the drawings, without this restricting the invention. In the figures.

DETAILED DESCRIPTION

Figure 1A:
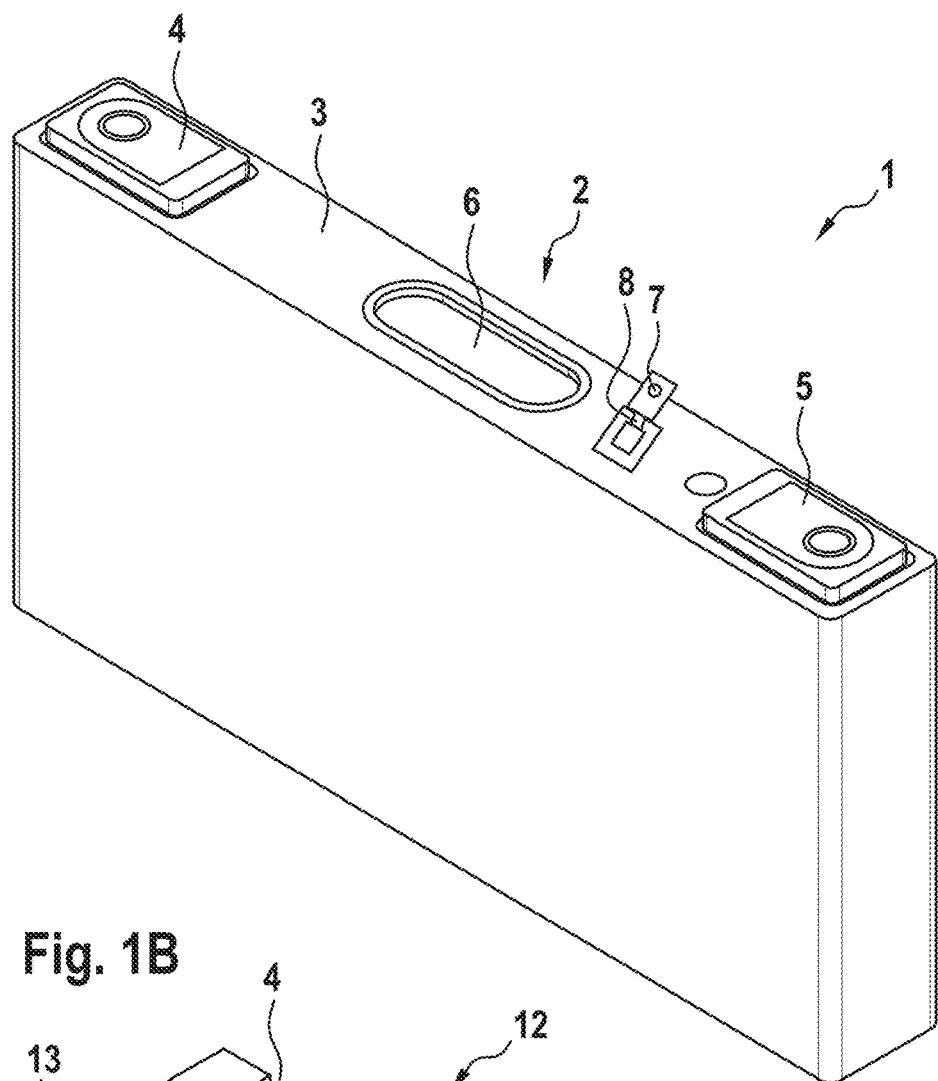
FIG. 1A shows a schematic illustration of a part of a traction battery of a motor vehicle, namely a battery cell of a cell module.
Figure 1B:
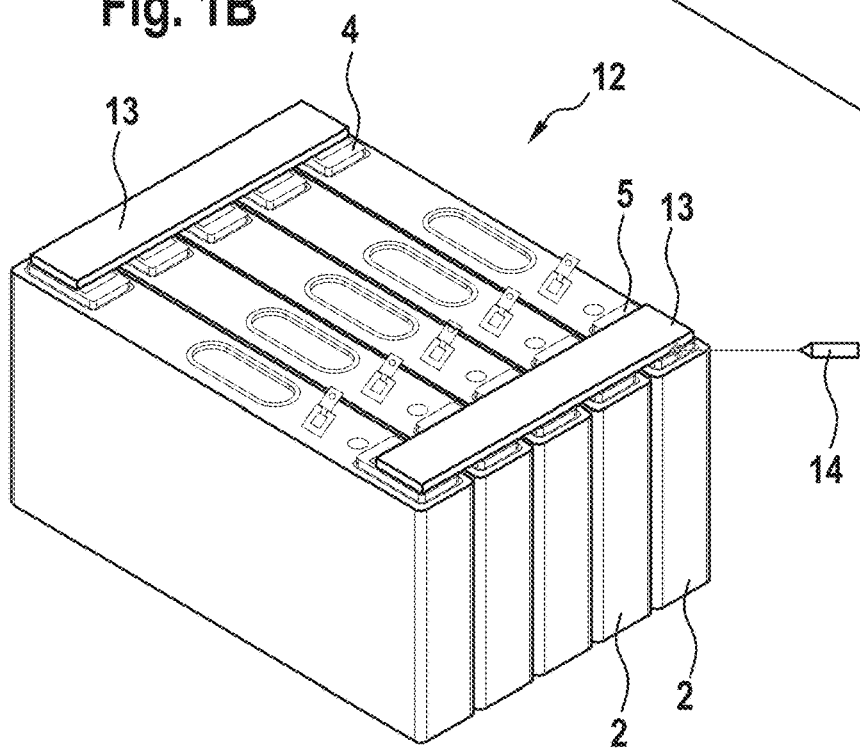
FIG. 1B shows a schematic illustration of an exemplary cell module having multiple battery cells.

FIGS. 1A-1B show schematic illustrations of a region of a traction battery 1 which has at least one cell module 12. The cell module 12 has multiple battery cells 2, one of which is shown here. The battery cell 2 has a cell housing 3 on which two electrical terminals 4 and 5 are arranged. The terminals of multiple battery cells 2 are electrically connected to one another via a common connector 13. The connector may be welded to the terminals by a laser beam generated the aid of a laser head 14. In addition, the cell housing 3 has a safety valve 6 in order to prevent excessive internal pressure in the battery cell 2.

A temperature sensor 7 is fastened to the cell housing 3, namely via a metal carrier 8. The metal carrier 8 is welded to the cell housing 3 of the battery cell 2. Each of the battery cells 2 of the traction battery 1 is preferably assigned a separate temperature sensor 7, each of which is connected to the respective cell housing 3 of the corresponding battery cell 2 via a metal carrier 8.

The connection of the temperature sensor 7 to the cell housing 3 via the metal carrier 8 has the advantage that very effective thermal coupling is established between the temperature sensor 7 and the cell housing 3, so that the temperature of the battery cell 2 can be measured with high accuracy by means of the temperature sensor 7. In addition, the connection of the temperature sensor 7 to the cell housing 3 is resistant to aging and therefore does not depend, or only to a very small extent, on the age of the traction battery 1 or the battery cell 2.

Figure 2:
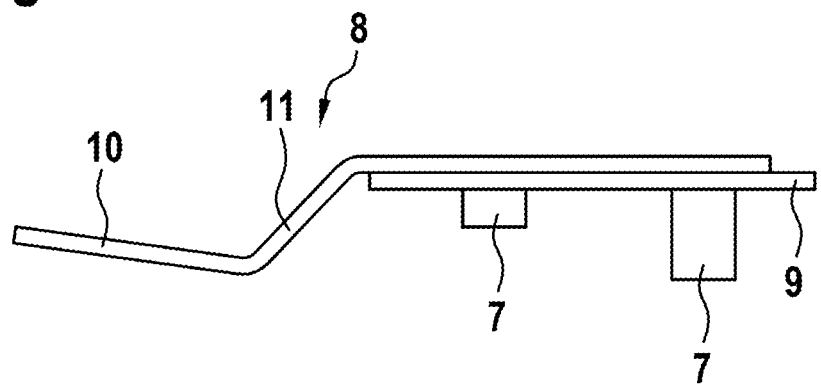
FIG. 2 shows a schematic illustration of an arrangement made up of a temperature sensor and a metal carrier in a first illustration.

FIG. 2 shows an extremely schematic illustration of an arrangement made up of the temperature sensor 7 and the metal carrier 8. In the exemplary embodiment shown here, multiple temperature sensors 7 are arranged on the metal carrier 8 and connected to the cell housing 3 via this. Electrical contacting with the temperature sensor 7 takes place via a printed circuit board 9, which in the exemplary embodiment shown here is preferably a flexible printed circuit board.

The metal carrier 8 has a retaining foot 10 and a connecting region 11. The retaining foot 10 is welded to the cell housing 3 of the respective battery cell 2. The temperature sensor 7 is connected to the retaining foot 10 via the connecting region 11. The retaining foot 10 and the connecting region 11 are embodied in one piece and made of the same material, that is to say they consist of the same continuous material.

Figure 3:
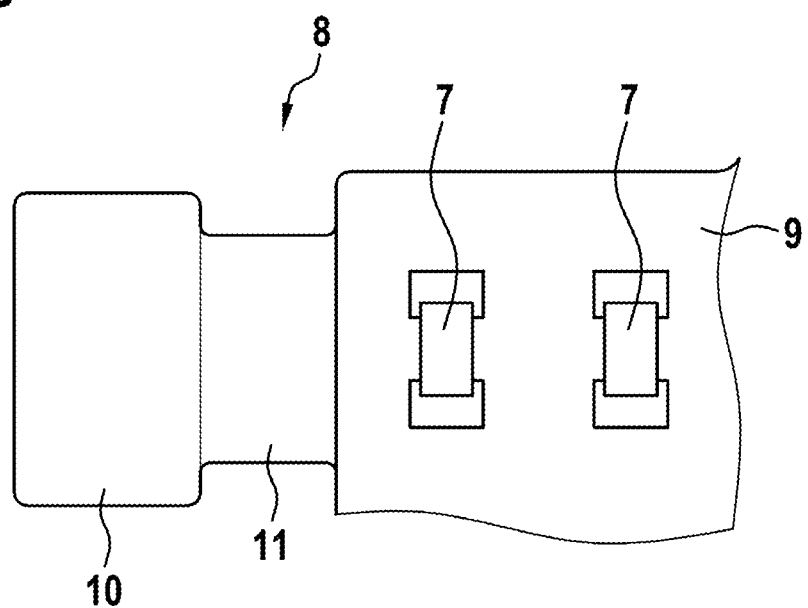
FIG. 3 shows the arrangement made up of the temperature sensor and the metal carrier in a second illustration.

FIG. 3 shows an alternative view of the arrangement made up of temperature sensor 7 and metal carrier 8 already described. It can be seen that the retaining foot 10 has a greater width than the connecting region 11 and preferably protrudes on both sides over the connecting region 11 in one direction. This ensures perfect contacting of the metal carrier 8 on the cell housing 3, i.e., simple welding. For example, the metal carrier 8 is connected to the cell housing 3 via at least one spot weld, but particularly preferably via multiple spot welds, in order to achieve a particularly reliable mounting of the temperature sensor 7 on the cell housing 3.

The described design of the traction battery 1 or the described procedure for connecting the temperature sensor 7 to the battery cell 2 has the advantage that, on the one hand, a highly accurate measurement of the temperature of the respective battery cell 2 can take place. In addition, the connection of the temperature sensor 7 is largely independent of the effects of aging, so that the accuracy of the temperature measurement is ensured over the service life of the traction battery 1.

LIST OF REFERENCE NUMERALS 1 traction battery
2 battery cell
3 cell housing
4 terminal
5 terminal
6 safety valve
7 temperature sensor
8 metal carrier
9 printed circuit board
10 retaining foot
11 connecting region

The invention claimed is:

1. A method for producing a traction battery, comprising:
arranging at least one cell module having multiple battery cells in the traction battery, providing each of the multiple battery cells with a separate temperature sensor;
arranging at least one temperature sensor on a metal carrier;
welding the metal carrier to a cell housing of the respective battery cell, wherein the metal carrier has a retaining foot which is wider than a connecting region carrying the at least one temperature sensor, the retaining foot is continuous with the connecting region, and is welded to an upper surface of the cell housing of the respective battery cell; and wherein each of the multiple battery cells has at least one terminal for electrical contact and the at least one terminal of each of the multiple battery cells is electrically connected to one another via a common connector, welding the common connector to the at least one terminal of each of the multiple battery cells by means of a same laser head as the metal carrier is welded to the cell housing.

2. The method according to claim 1, wherein the common connector is welded to the terminals in a same work step as the metal carrier is welded to the cell housing.

3. The method according to claim 2, wherein the welding is carried out by laser welding.

4. The method according to claim 1, wherein the at least one temperature sensor is arranged on a printed circuit board which is connected to the metal carrier.

5. The method according to claim 4, wherein a flexible printed circuit board is used as the printed circuit board.

6. The method according to claim 1, wherein a prismatic battery cell is used as the battery cell.

7. The method according to claim 2, wherein the at least one temperature sensor is arranged on a printed circuit board which is connected to the metal carrier.

8. The method according to claim 3, wherein the at least one temperature sensor is arranged on a printed circuit board which is connected to the metal carrier.

* * * * *